March 23, 1937.  A. Y. DODGE  2,074,503
LUBRICATING DEVICE
Filed Feb. 1, 1932   2 Sheets-Sheet 1

INVENTOR.
ADIEL Y. DODGE
BY
ATTORNEY.

March 23, 1937.  A. Y. DODGE  2,074,503
LUBRICATING DEVICE
Filed Feb. 1, 1932  2 Sheets-Sheet 2
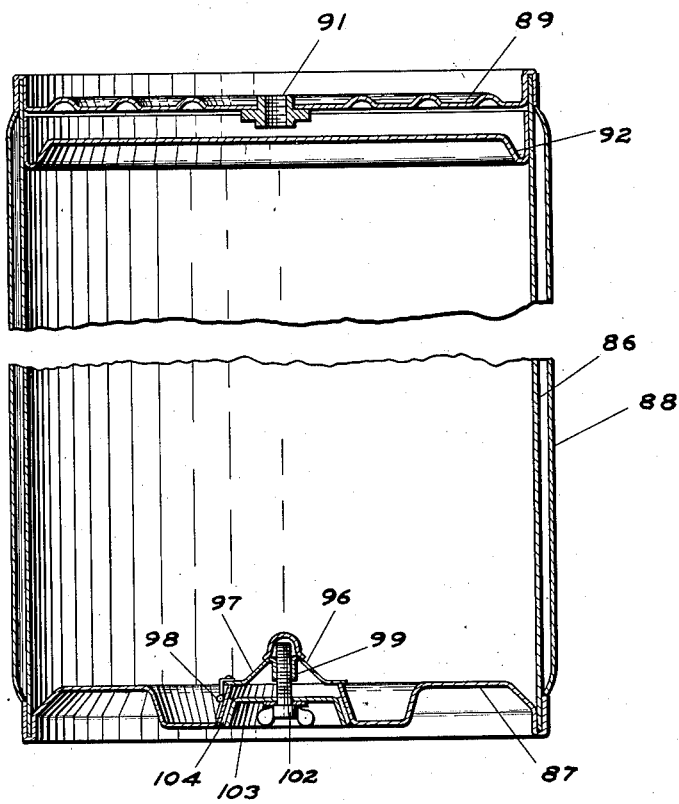
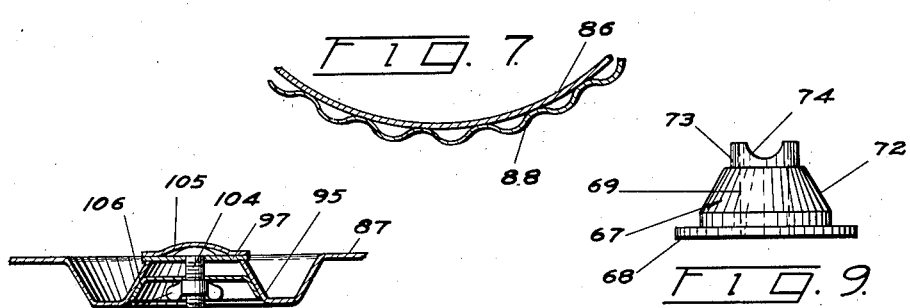
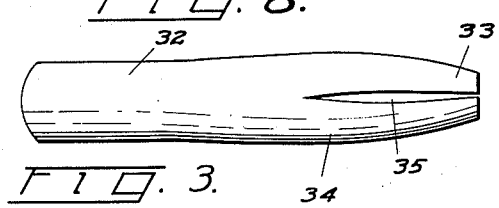
INVENTOR.
ADIEL Y. DODGE
BY
ATTORNEY.

Patented Mar. 23, 1937

2,074,503

UNITED STATES PATENT OFFICE 2,074,503

LUBRICATING DEVICE

Adiel Y. Dodge, South Bend, Ind., assignor to The Lubrication Corporation, South Bend, Ind., a corporation of Delaware Application February 1, 1932, Serial No. 590,049

10 Claims. (Cl. 221—47.1)

This invention relates to lubrication devices and particularly to improvements in large lubricant containers and means for withdrawing lubricant therefrom.

One of the objects of the invention is to facilitate the opening of the lower end of large lubricant containers so that the lubricant may be drawn therefrom.

A further object of the invention is to provide a lubricant container which may be tightly closed during shipment and transportation, and yet can be opened easily, when desired.

A further object is to provide a support capable of opening the lubricant container and of conducting the lubricant from the container to a lubricant pump.

A further object is to provide a lubricant container having protective means for preventing damage to the inner container walls as during handling.

A further object is to provide a lubricant container having means for guiding the discharge end into proper registration with the support and feeder apparatus with which it is used.

Further objects will be or should be apparent from a reading of the following specification and claims and from a consideration of the accompanying drawings.

Several embodiments of the invention are shown in the drawings, in which:

Fig. 3 is an exaggerated view of a plug shown in Fig. 2;

Fig. 6 is a sectional view of another modified form of container to be used with any of the holders shown in Figs. 1, 2 and 4;

Fig. 7 is a fragmentary sectional view taken through one of the sides of the container shown in Fig. 6;

Fig. 8 is a sectional view of a portion of the lower part of another modified form of container; and Fig. 9 is a side elevation of a part of the holder shown in dotted lines in Fig. 4.

Figures 1, 2:
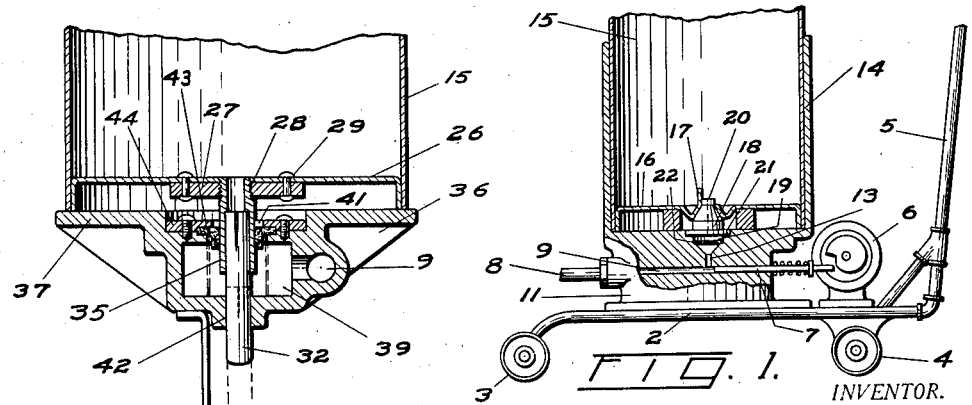
Fig. 1 is a side elevation partly in section showing a truck equipped with a lubricant pump and with a holder for a large lubricant container illustrating an embodiment of my invention.
Fig. 2 is a sectional view of a modified form of holder and container and of associated means for opening a lubricant container.

Referring particularly to the drawings, I have shown in Fig. 1 a truck 2, equipped with wheels 3 and 4, a handle 5 therefor and an electric motor 6 adapted to drive a plunger 7 of a lubricant pump by means of which lubricant is forced out through the conduit 8. The plunger 7 is mounted for reciprocation in a pressure cylinder 9 formed in a support or holder 11. The cylinder 9 communicates with a bore 13 forming an inlet passage extending downward through the support 11. The support 11 is provided with an upwardly extending casing 14 within which is placed a large lubricant container 15 which is permitted to rest upon the support 11. The lower end of the container 15 is closed by a head 16 which serves during the shipment and transportation of the container to prevent lubricant from escaping therefrom.

The closure 16 is formed with a frangible seal 17 at the central portion thereof formed by describing a broken circular scoring on the closure wall, so that all but a part of the seal will be severed from the closure when a directed force is applied thereto, the unsevered portion serving as a hinge upon which the seal may be bent inwardly and held free of the outlet so formed. An inlet stud 18 is centrally mounted upon the support 11 and is provided with a central bore thru which lubricant may pass to a recess 19 below the stud and thence through the bore 13 into the pump cylinder 9. The outer wall of the stud 18 is conical to conform with a similarly formed surface on the closure 16 about the seal 17 so as to form a lubricant tight seal between stud and container. The upper end 20 of the stud is cylindrical and has a diameter equal to the diameter of the seal 17 and extends upwardly to a point above that initially occupied by the seal 17.

A screen 22 is secured in the recess 19 below the lower end of the stud 18 to prevent the entrance of undesired foreign matter into the pump.

In using a lubricating device as described, it is only necessary for the operator to lift the large container 15 by a windlass or other suitable means and then let it down within the casing 14. As the container is lowered the casing guides the passage of the container downward so that the upper end of the stud 18 contacts with the frangible seal 17 of the closure 16 to sever the seal along its scoring leaving it in substantially the position shown in the drawings. Lubricant from the container is now free to flow downward through the bore of the stud 18, into the bore 13 so that reciprocation of the piston 7 draws lubricant into the cylinder 9 and forces it out through the conduit 8. The conical shoulder adjacent to the upper portion of the stud 18 co-operates with the corresponding conical surface of the closure 16 to provide a seal for preventing the escape of lubricant past the joint between the closure 16 and the stud, the weight of lubricant pressing on the sloping portion of the closure 16 aiding in effecting this seal.

In Figs. 2 to 9, inclusive, similar parts will be designated by similar numerals and only those parts which differ will be described in detail.

Another form of container is shown in Fig. 2 having an end closure 26 secured in any suitable manner to the container 15 and provided with a centrally located reinforcing plate 27 securely fastened thereto. The closure 26 and plate 27 are formed with contiguous tapped openings 28 adapted during shipment of the container to receive a solid threaded plug (not shown) which effectively seals the opening. When it is desired, to dispense the lubricant in the container 15, a hollow externally threaded sleeve 29 is substituted for the threaded plug used during transportation and handling of the container. The sleeve 29 is stopped by a removable plug 32, during the process of associating the container 15 with the holder. The plug 32 is shown in enlarged detail in Fig. 3 and is tapered at its inner end 33 to facilitate entrance into the sleeve 29. It is further formed with a bulge at 34 to prevent it from being accidentally expelled from the sleeve and is provided with a split 35 which allows it to contract as it is driven into the sleeve. The structure of the plug causes the split prongs to spread apart normally especially at the bulge 34 to increase the frictional resistance and prevent accidental dislodgement.

The holder or support 36 for the container provides a ledge 37 upon which the lower end of the container is adapted to rest. A stop 38 is secured to the support 36 against which the lower end of the plug 32 is adapted to rest while lubricant is being dispensed by the pump. The support 36 is also provided with a chamber 39 into which lubricant flowing downward through the sleeve 29 after the plug 32 has been lowered, may pass from the container 15.

An annular gasket 43 is disposed at the mouth of the chamber 39 and held in place by an annular plate 44. The gasket is formed to admit the sleeve 29 therethru and to establish a lubricant tight seal therebetween. A bore 42 extends thru the lower wall of the chamber 39 and is aligned with the axis of the chamber and the gasket 43.

In assembling this form of lubricant container, with the holder a support 36, the solid threaded plug previously mentioned is withdrawn from the threaded bore 28, and the sleeve 29 closed with the removable plug 32 is substituted. The container 15 is then inverted and lowered and the sleeve 29 inserted through the gasket 43 with the removable plug 32 extending down through the bore 42. Thereafter the plug 32 is pulled down until it contacts with the stop 38, permitting lubricant to flow down through the sleeve 29 into the chamber 39 and to the cylinder 9. Lubricant will not pass out through the bore 42 inasmuch as that bore is closed by the upper or bulged end of the closure plug 32.

Figure 4:
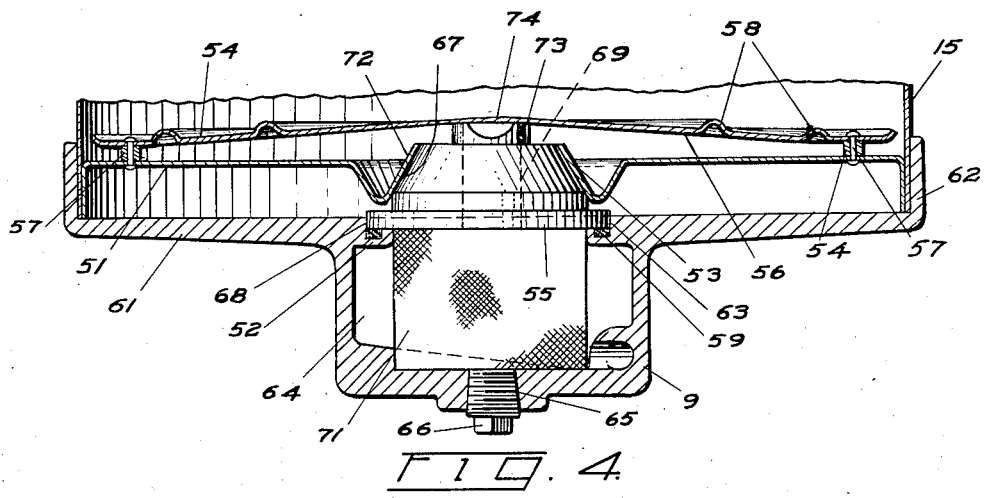
Fig. 4 is a sectional view showing another form of container with the holder and opening means.

In the embodiment shown in Fig. 4, the means for closing the lower end of the container 15 comprises a closure 51 formed with an inwardly extending conical walled outlet 55, the inner surface 53 of which forms a seat for engagement with a lubricant conducting stud 67 having a similarly formed outer wall 72 as shown in Fig. 9. The outlet 55 is closed during transportation by a resilient plate 56, secured adjacent to its edges to the closure 51 and spaced apart therefrom in any suitable manner, as by rivets and spacers 57 and 54 respectively. The plate 56 is formed with a plurality of annular ribs 58, which lend resiliency to the plate and allow it to be flexed during the dispensing operation to the position shown in dotted lines in Fig. 4. However, the resilience of the plate and the weight of lubricant above it maintains the plate during transportation and handling upon its seat in contact with the rim of the outlet opening 55 so that an effective seal is provided to prevent the escape of lubricant. A support 61 for the container shown in Fig. 4 having the primary function of the support 11 is provided with a cylindrical flange 62 within which the lower end of the container is received. The support 61 is also provided with a central opening 63, thru its upper wall, a chamber 64 forming a passage connecting said opening to the pump cylinder 9, and a drain opening 65 normally closed by a plug 66. The lubricant conductor stud 67 extends above the upper surface of the support 61 and is provided with a flange 68 which rests upon a gasket 59. The gasket is supported upon an integral inwardly extending flange 52 formed on the inner wall of the opening 63. The stud 67 is formed with a central bore 69 through which lubricant is adapted to pass downward into the chamber 64, and the conical walled portion 72 is sufficiently above the upper surface of the support as to contact with the conical portion 53 of the closure 51 and thus form a lubricant tight seal therebetween. A cylindrical extension 73 is formed above the conical portion 72 of the stud 67 the upper end of which is formed with a plurality of semi-circular cut-outs 74 so that lubricant may readily flow into the bore 69. A screen 71 is positioned in the chamber 64 for straining the lubricant as it enters the chamber 64 thru the stud 67.

When the lubricant container shown in Fig. 4 is reversed and placed upon the support 61, the extension 73 contacts with the resilient plate 56 and raises it from its seat to the position shown. Thereupon lubricant may pass between the plate 56 and the closure 51, over the conical walled portion 53, through the cut-outs 74 and the bore 69, into the chamber 64. After reaching the chamber 64 the lubricant may pass through the screen 71 into the cylinder 9 where it may be forced out thru the conduit 8 by the lubricant pump to a suitable nozzle connected therewith.

Figure 5:
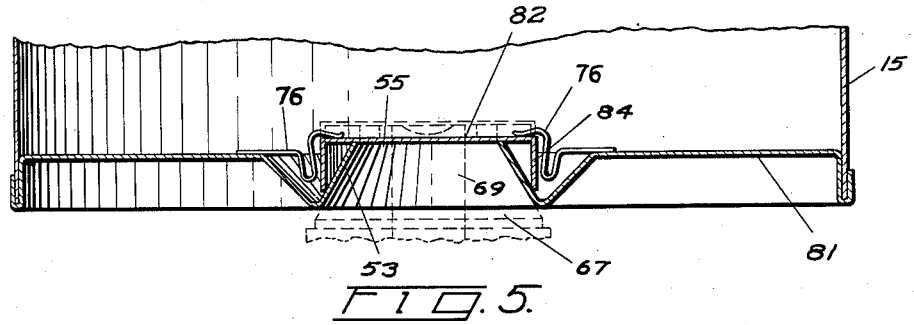
Fig. 5 is a sectional view of a further modification of the container.

In the embodiment shown in Fig. 5 the container cylinder 15 is provided with a closure 81 identical to the closure 51 shown in Fig. 4, except for the method of fastening it to the side walls of the container, having a similar conical walled outlet 55. It is adapted to cooperate with a holder 61 shown in Fig. 4. However, instead of the resilient closure 56, I provide in this modification a cap or cover 82, provided with a flange 84 which is held in place over the outlet 55 by a pair of diametrically opposed spring clips 76 secured to the closure 81. The flange 84 is arranged to lie within the annular indentation formed about the conical outlet serving to prevent lateral displacement of the cover. The operation and utilization of this form of container, holder, and opening means is substantially the same as previously described in connection with Fig. 4.

Normally the spring clip 76 and the weight of the lubricant holds the cover 82 in place. When the container is inverted and placed upon the support 61 however the extension 73 of the stud 67 engages with the cover to retain the cover against descent as the container is lowered in place. During this operation the spring clips will yield to release the cover.

In Fig. 6 I have shown a container formed by a smooth cylinder 86, a lower end closure 87, a corrugated outer protective cylinder 88, and a corrugated upper closure 89. Both of the closures 87 and 89 are provided with a pair of peripheral flanges which form grooves in which the ends of the cylinder may be inserted. The upper closure 89 may be provided with a vent opening 91 adapted to be closed during transportation by a plug. The container itself is provided with a follower piston 92. The lower end closure 87 is formed with a conical walled outlet opening 96 normally closed by a plate 97 hinged at 98, formed with a central threaded socket 99. The hinged plate 97 is normally held tightly in contact with the edge of the opening 96 by a thumb screw 102 fastened through a locking plate 103 bearing upon a packing 104 which in turn bears upon the outside of the conical wall of the outlet 96.

In assembling this form of container, the smooth cylinder 86 is first telescoped into the groove formed at the outer edge of the closure 87. The corrugated cylinder 88 is then telescoped over the smooth cylinder 86, its lower edge contacting with the outer peripheral flange. The lubricant is then put into the cylinder and the follower is placed over the lubricant. Thereafter the peripheral flanges of the closure 89 are telescoped over the upper end of the smooth cylinder 86, one of the flanges thus bearing against the upper end of the corrugated cylinder 88 and holding it in position. In opening the container, the thumb screw 99 is first removed and the plate 103 together with the packing 104 is removed. The container is next placed upon one of the holders shown in Figs. 1, 4, or 5. The extension 73 of the stud 67 associated with the holder causes the plate 97 to move upon its hinge and thus allow lubricant to escape downward through the opening 96 into the chamber of the support.

The embodiment shown in Fig. 8 is in many respects similar to that shown in Fig. 6, and like parts are indicated by the same numerals. However, the plate 97 is not hinged and the screw 102 is securely fastened to the plate 97, a sealing cover 105 being also securely fastened to the plate 97 above the head of the screw 102. A flanged plate 106 is adapted to contact with the wall of the conical walled outlet 96 and a thumb nut 107 is turned onto the screw 104, thus maintaining the parts in their proper relationship during shipment. However, the removal of the thumb nut 107 allows the removal of the flanged plate 106 and allows the plate 97 to be removed from its seat by the extension 73 of the stud 67 of the holders as those shown in Figs. 1, 4 and 5.

It is to be understood that the above described embodiments of the invention are for the purpose of illustration only, and various changes may be made therein without departing from the spirit and scope of the invention.

I claim:

1. In a lubrication device, a container for lubricant, a closure for the lower end of said container formed with a frangible seal, the relationship between the rupturing pressure of said seal and the weight of said container being such as to cause said seal to rupture under a force in pounds less than the weight of said container, a support for said container including a lubricant conducting stud so arranged on said support as to extend through the frangible seal of said closure under the force of gravity acting upon the container when the container is in place thereupon and to cooperate with the wall of said closure to provide a lubricant tight seal therebetween.

2. In a lubrication device, a container for lubricant having a relatively thin wall with an outlet opening therein, the wall around said opening forming a seat, a support for said container, an inlet stud on said support, and means for closing the lower end of said container comprising a member resting upon said seat and closing said outlet opening, said stud engaging said member when the container is placed on the support to raise the member from the seat and to establish a seal with the wall of the container around the outlet opening.

3. A lubricating device comprising, in combination, a lubricant container supporting body formed with a passageway, a pump associated with said body, a screen within said body, and located across said passageway, and an upwardly extending tubular stud fixed to said body and communicating with said passageway for forming an opening in the bottom of said container under the force of gravity acting upon said container when lowered upon said support and for cooperating with the end wall of the container to provide a lubricant tight seal between the container and the stud.

4. In a lubrication device, a container having a closure for one end formed with an outlet passageway, and a resilient plate secured at a plurality of points about its periphery to said closure covering said passageway at the inner end thereof yieldingly to close the passageway.

5. In a lubrication device, a container having a closure for one end formed with an opening, and a resilient plate secured to said closure within said container and covering said opening, said plate being formed with a plurality of annular ridges.

6. In a lubrication device, an original package container for lubricant having a closure for one end, said closure having a circular conical walled outlet opening extending inwardly of the container; and a cap on the inner side of said closure for closing said opening said cap being movable relative to said container to open and close the outlet opening.

7. In a lubrication device, a container having a closure for one end secured permanently thereto, having a conical walled outlet opening extending inwardly of the container; and a cap on the inner side of said closure for closing said opening, said cap having a flange extending about the outer wall of said outlet.

8. In a lubrication device a container having a closure for one end permanently secured thereto, having an annular internal depression, and a concentric outlet opening; and a cap for said opening having a flange extending into said depression, the flange being inclined with respect to the adjacent and contacting wall of the depression.

9. In a lubrication device a container having a closure permanently secured in one end, said closure having an annular internal depression, and a concentric outlet opening; a cap for said opening having a flange extending into said depression, and yieldable means for holding said cap over said outlet opening.

10. In a lubrication device, a container having a closure for one end formed with an opening therethrough, the walls defining said opening projecting inwardly of the container to a plane parallel with the inner wall of the closure, and a resilient plate within the container secured at a plurality of points about its peripheral portion to the inner wall of said closure to cause said plate yieldingly to bear upon the walls of said opening normally to close the opening.

ADIEL Y. DODGE.